(12) United States Patent
Sakai et al.

(10) Patent No.: US 11,807,246 B2
(45) Date of Patent: Nov. 7, 2023

(54) DROWSINESS SIGN NOTIFICATION SYSTEM AND DROWSINESS SIGN NOTIFICATION METHOD

(71) Applicants: TOYOTA JIDOSHA KABUSHIKI KAISHA, Toyota (JP); CMC CORPORATION, Nagoya (JP)

(72) Inventors: Kaori Sakai, Nagoya (JP); Takaaki Ito, Tokyo-to (JP); Tetsu Yajima, Nagoya (JP); Koichiro Yamauchi, Tokyo-to (JP); Masataka Sano, Tokyo-to (JP); Takuya Sakata, Tokyo-to (JP)

(73) Assignees: TOYOTA JIDOSHA KABUSHIKI KAISHA, Toyota (JP); CMC CORPORATION, Nagoya (JP)

( * ) Notice: Subject to any disclaimer, the term of this patent is extended or adjusted under 35 U.S.C. 154(b) by 199 days.

(21) Appl. No.: 17/363,180

(22) Filed: Jun. 30, 2021

(65) Prior Publication Data

US 2022/0001875 A1 Jan. 6, 2022

(30) Foreign Application Priority Data

Jul. 1, 2020 (KE) ................ 2020-114154

(51) Int. Cl.
*B60W 40/08* (2012.01)
*G01C 21/36* (2006.01)
(Continued)

(52) U.S. Cl.
CPC ............ *B60W 40/08* (2013.01); *B60W 50/14* (2013.01); *B60W 60/0015* (2020.02);
(Continued)

(58) Field of Classification Search
CPC ........ B60W 50/14; B60W 2040/0827; B60W 2540/229; B60W 60/00133; G01C 21/3685; G01C 21/3697
See application file for complete search history.

(56) References Cited

U.S. PATENT DOCUMENTS

2013/0054136 A1* 2/2013 Tomita ............... G01C 21/3629
701/428
2015/0239477 A1* 8/2015 Kitagawa ........... G01C 21/3407
701/1
(Continued)

FOREIGN PATENT DOCUMENTS

JP 3441933 B2 * 9/2003 ........... G01C 21/367
JP 3543559 B2 * 7/2004 ........... G01C 21/367
(Continued)

*Primary Examiner* — Shelley Chen
(74) *Attorney, Agent, or Firm* — Dickinson Wright, PLLC

(57) ABSTRACT

A drowsiness sign notification system applied to a vehicle includes a driver monitor and a controller. The driver monitor detects a driver state being a state of a driver of the vehicle. The controller executes a drowsiness sign determination process that determines whether or not the driver shows a drowsiness sign based on the driver state. When it is determined that the driver shows the drowsiness sign and an activation condition is satisfied, the controller executes rest area informing process that informs the driver of a rest area. The activation condition of the rest area informing process is set from a viewpoint of a relationship between a location of the rest area and a target route of the vehicle, or an expected time required for the vehicle to reach the rest area.

5 Claims, 12 Drawing Sheets

(51) Int. Cl.
  *B60W 50/14*  (2020.01)
  *B60W 60/00*  (2020.01)
(52) U.S. Cl.
  CPC . *G01C 21/3685* (2013.01); *B60W 2040/0827* (2013.01); *B60W 2540/229* (2020.02)

(56) References Cited

U.S. PATENT DOCUMENTS

2020/0139992 A1* 5/2020 Oba .................. G08G 1/16
2022/0161813 A1* 5/2022 Oba ................ G08G 1/096775

FOREIGN PATENT DOCUMENTS

| JP | 3778322 B2 * | 5/2006 | ........... G01C 21/367 |
| JP | 3816598 B2 * | 8/2006 | ........... G01C 21/367 |
| JP | 4001026 B2 * | 10/2007 | ........... G01C 21/367 |
| JP | 2013-047618 A | 3/2013 | |
| JP | 2014-013496 A | 1/2014 | |
| JP | 2017078979 A | 4/2017 | |
| JP | 2020046727 A | 3/2020 | |
| WO | 2014/006835 A1 | 1/2014 | |
| WO | WO-2014006835 A1 * | 1/2014 | ......... G01C 21/3697 |

* cited by examiner

DROWSINESS SIGN NOTIFICATION SYSTEM AND DROWSINESS SIGN NOTIFICATION METHOD

BACKGROUND

Technical Field

The present disclosure relates to a technique that notifies that a driver of a vehicle shows a drowsiness sign.

Background Art

Patent Literature 1 discloses an in-vehicle drowsiness prevention device that makes a driver of a vehicle stay awake. When detecting drowsiness of the driver, the in-vehicle drowsiness prevention device dialogically requests the driver for speech input.

Patent Literature 2 discloses an in-vehicle device. When identifying a health problem of a driver during vehicle travel, the in-vehicle device performs an awaking operation.

LIST OF RELATED ART

Patent Literature 1: Japanese Laid-Open Patent Application Publication No. JP-2017-78979
Patent Literature 2: Japanese Laid-Open Patent Application Publication No. JP-2020-46727

SUMMARY

When a driver of a vehicle shows a drowsiness sign, it is conceivable to inform the driver of a rest area. However, unconditionally giving rest area information without considering a location of a rest area and an informing timing is not appropriate. For example, in a case where a target route of the vehicle is already set, it is not preferable to give information of a rest area whose location is hard for the vehicle to return back to the target route. As another example, if information of a rest area is given immediately before the rest area, the vehicle possibly passes the rest area in the middle of giving the information.

An object of the present disclosure to provide a technique that can appropriately inform a driver of a vehicle of a rest area when the driver shows a drowsiness sign.

A first aspect is directed to a drowsiness sign notification system applied to a vehicle.

The drowsiness sign notification system includes:
a driver monitor configured to detect a driver state being a state of a driver of the vehicle; and
a controller.

The controller is configured to execute:
a drowsiness sign determination process that determines whether or not the driver shows a drowsiness sign based on the driver state; and
rest area informing process that informs the driver of a rest area, when it is determined that the driver shows the drowsiness sign and an activation condition is satisfied.

A branch point is a position at which a target route of the vehicle branches from a road on which the vehicle is currently traveling.

A first distance is a distance from a current position of the vehicle to the rest area.

A second distance is a distance from the current position to the branch point.

A third distance is a distance between the rest area and the branch point.

The activation condition of the rest area informing process includes that the second distance is larger than the first distance and the third distance is equal to or larger than a predetermined distance.

A second aspect is directed to a drowsiness sign notification system applied to a vehicle.

The drowsiness sign notification system includes:
a driver monitor configured to detect a driver state being a state of a driver of the vehicle; and
a controller.

The controller is configured to execute:
a drowsiness sign determination process that determines whether or not the driver shows a drowsiness sign based on the driver state; and
rest area informing process that informs the driver of a rest area, when it is determined that the driver shows the drowsiness sign and an activation condition is satisfied.

The activation condition of the rest area informing process includes that an expected time required for the vehicle to reach the rest area from a current position is longer than a judgment criterion time.

The judgment criterion time at least includes an informing time required for the rest area informing process.

A third aspect is directed to a drowsiness sign notification method applied to a vehicle.

The vehicle has a driver monitor that detects a driver state being a state of a driver of the vehicle.

The drowsiness sign notification method includes:
a drowsiness sign determination process that determines whether or not the driver shows a drowsiness sign based on the driver state; and
rest area informing process that informs the driver of a rest area, when it is determined that the driver shows the drowsiness sign and an activation condition is satisfied.

A branch point is a position at which a target route of the vehicle branches from a road on which the vehicle is currently traveling.

A first distance is a distance from a current position of the vehicle to the rest area.

A second distance is a distance from the current position to the branch point.

A third distance is a distance between the rest area and the branch point.

The activation condition of the rest area informing process includes that the second distance is larger than the first distance and the third distance is equal to or larger than a predetermined distance.

According to the first and third aspects, the activation condition of the rest area informing process is set from a viewpoint of a relationship between a location of the rest area and the target route. More specifically, the activation condition of the rest area informing process is set from a viewpoint of a relationship between the first distance, the second distance, and the third distance. As a result, it is prevented that information of the rest area whose location is hard for the vehicle to return back to the target route is given.

According to a second aspect, the activation condition of the rest area informing process is set from a viewpoint of the expected time required for the vehicle to reach the rest area. As a result, it is prevented that the vehicle passes the rest area in the middle of giving information.

EMBODIMENTS

Embodiments of the present disclosure will be described with reference to the accompanying drawings.

1. Outline

Figure 1:
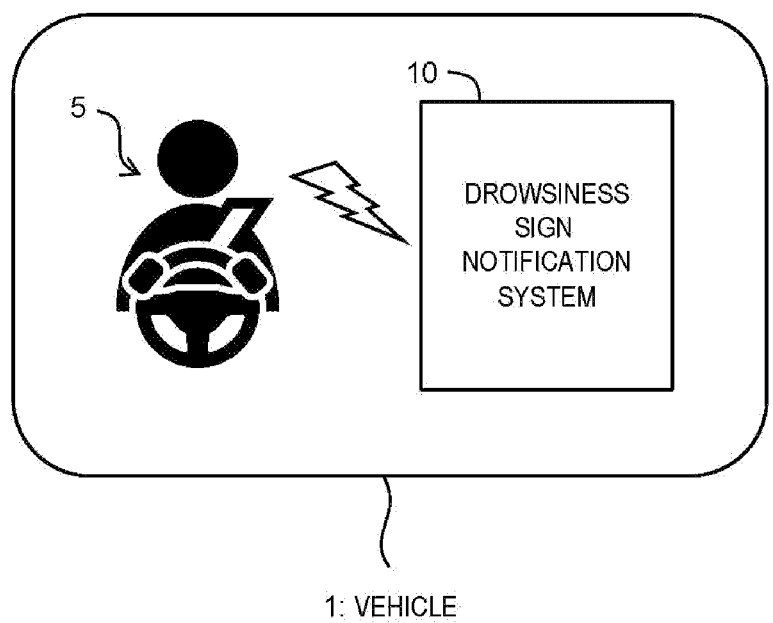
FIG. 1 is a conceptual diagram for explaining an outline of a drowsiness sign notification system according to an embodiment of the present disclosure.

FIG. 1 is a conceptual diagram for explaining an outline of a drowsiness sign notification system 10 according to the present embodiment. The drowsiness sign notification system 10 detects a "drowsiness sign" of a driver 5 of a vehicle 1. Here, the "drowsiness sign" means a state in which an awareness degree of the driver 5 is lowered before and after the driver 5 feels drowsiness. Typically, the drowsiness sign appears as a drowsiness action that is peculiar to the period before and after the driver 5 feels the drowsiness. Even if the driver 5 is not aware of the drowsiness, the drowsiness sign may be detected. In any case, it is before the driver 5 falls asleep that the drowsiness sign is detected.

More specifically, the drowsiness sign notification system 10 includes a driver monitor that detects a driver state that is a state of the driver 5. The drowsiness sign notification system 10 determines whether or not the driver 5 shows a drowsiness sign based on the driver state detected by the driver monitor. For example, the drowsiness sign notification system 10 determines, based on the driver state, whether or not there is a drowsiness action peculiar to the period before and after the driver 5 feels the drowsiness, thereby determining whether or not the driver 5 shows the drowsiness sign.

When it is determined that the driver 5 shows the drowsiness sign, that is, when the drowsiness sign is detected, the drowsiness sign notification system 10 notifies (feeds back) the detection of the drowsiness sign to the driver 5. The notice (feedback) is hereinafter referred to as a "drowsiness sign notice FB." The drowsiness sign notification system 10 gives the drowsiness sign notice FB to the driver 5 through display, audio, vibration, or the like. Such the drowsiness sign notice FB makes it possible to apply a stimulus to the driver 5 and to keep an awake state of the driver 5. In other words, the drowsiness sign notice FB makes it possible to prevent the driver 5 from becoming an asleep state and to keep the driver 5 at a state suitable for driving.

Figure 2:
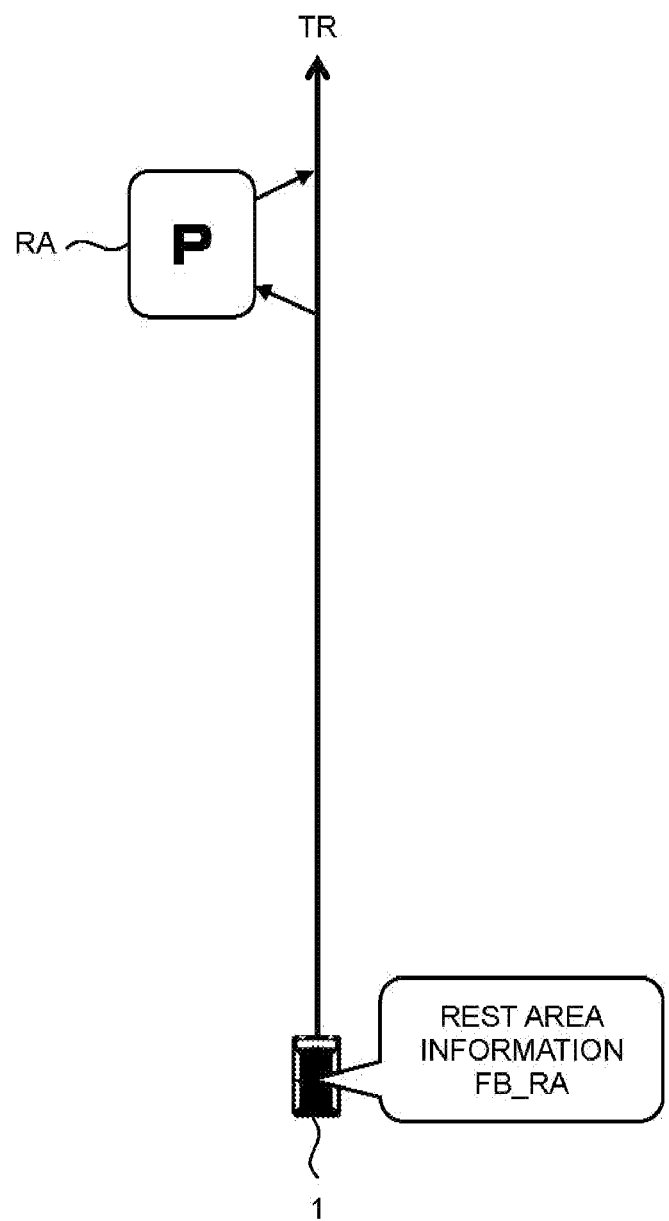
FIG. 2 is a conceptual diagram for explaining rest area information that is an example of a drowsiness sign notice according to an embodiment of the present disclosure.

FIG. 2 is a conceptual diagram for explaining "rest area information FB_RA" that is an example of the drowsiness sign notice FB. The rest area information FB_RA informs (notifies) a rest area RA to the driver 5 who is determined to show the drowsiness sign. The rest area RA is a facility in which the driver 5 is able to take a break or take a nap. Examples of the rest area RA in an express way and a bypass include a service area (SA) and a parking area (PA). Examples of the rest area RA in a normal road include a convenience store, a gas station, a roadside station, and the like. The rest area information FB_RA includes positively suggesting to the driver 5 to stop by the rest area RA.

Typically, the drowsiness sign notification system 10 gives the rest area information FB_RA to the driver 5 through audio. In one embodiment, the drowsiness sign notification system 10 dialogically suggests to the driver 5 to stop by the rest area RA. For example, the rest area information FB_RA includes a suggestion message (e.g., "There is a Shizuoka service area nearby. Do you want to stop by?") to the driver 5. The driver 5 returns an answer (Yes/No) to the suggestion message. In a case where the driver 5 accepts the suggestion, the drowsiness sign notification system 10 sets the rest area RA as a stop-off point.

However, unconditionally giving the rest area information FB_RA without considering a location of the rest area RA and an informing timing is not appropriate. As an example, a case where a target route TR required for the vehicle 1 to reach a final destination is already set is considered. In this case, it is not preferable to give information of a rest area RA whose location is hard for the vehicle 1 to return back to the target route TR. As another example, if information of a rest area RA is given immediately before the rest area RA, the vehicle 1 possibly passes the rest area RA in the middle of giving the information.

In view of the above, according to the present embodiment, a location of the rest area RA and/or an informing timing is taken into consideration in order to appropriately give the rest area information FB_RA to the driver 5. Even when the driver 5 shows the drowsiness sign, the drowsiness sign notification system 10 does not unconditionally give the rest area information FB_RA. Only when an "activation condition" is satisfied, the drowsiness sign notification system 10 gives the rest area information FB_RA to the driver 5.

Hereinafter, the drowsiness sign notification system 10 according to the present embodiment will be described in more detail.

2. Drowsiness Sign Notification System

2-1. Configuration Example

Figure 3:
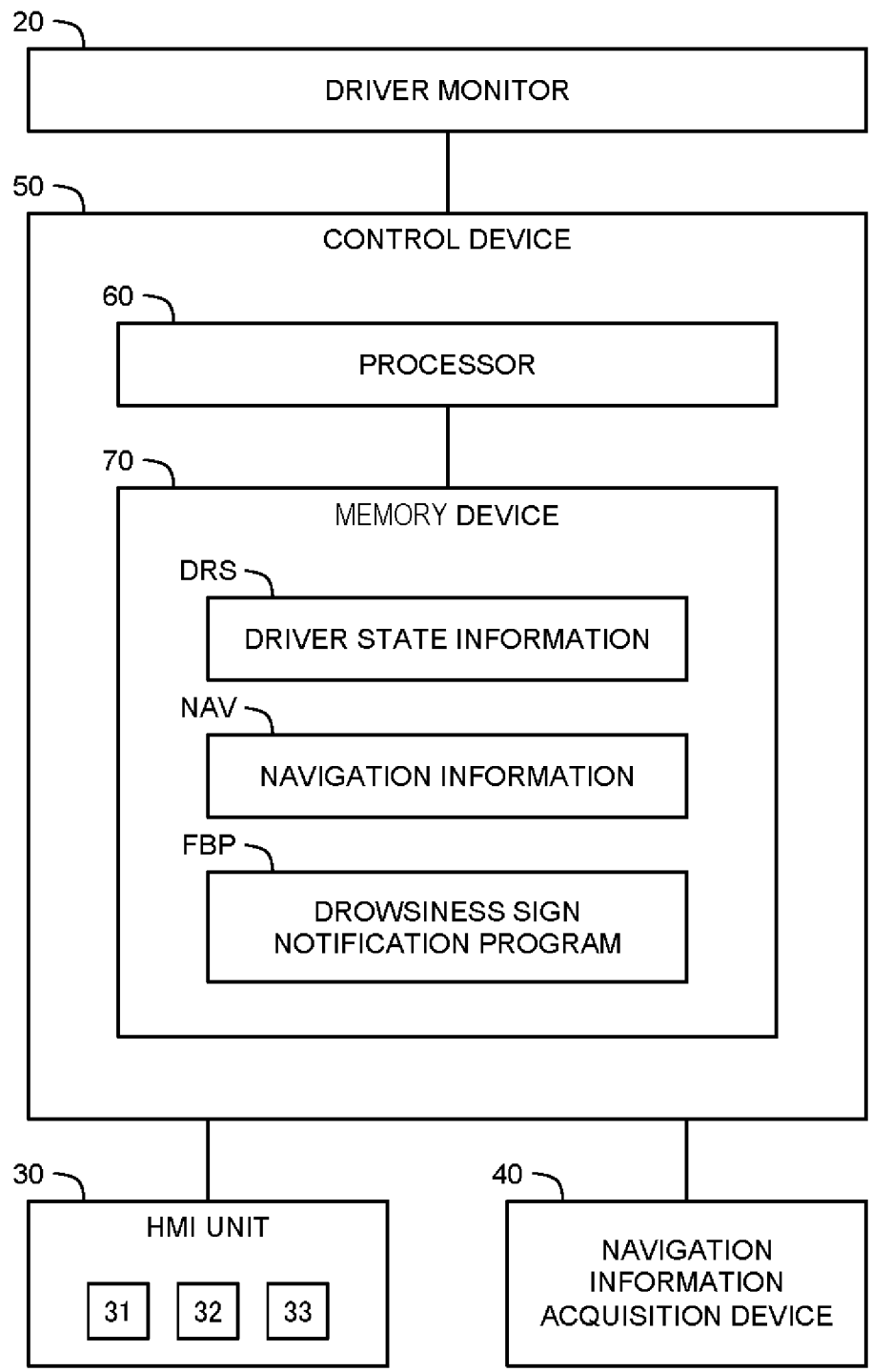
FIG. 3 is a block diagram showing a configuration example of the drowsiness sign notification system according to an embodiment of the present disclosure.

FIG. 3 is a block diagram showing a configuration example of the drowsiness sign notification system 10 according to the present embodiment. The drowsiness sign notification system 10 includes a driver monitor 20, an HMI (Human Machine Interface) unit 30, a navigation information acquisition device 40, and a control device (controller) 50.

The driver monitor 20 is installed on the vehicle 1 and detects a driver state which is a state of the driver 5. For example, the driver monitor 20 includes a camera that captures an image of the driver 5. Driver state information DRS indicates the driver state detected by the driver monitor 20. For example, the driver state information DRS indicates a degree of eye opening, a degree of mouth opening, a face orientation, a line of sight, and the like of the driver 5.

The HMI unit 30 is an interface that outputs information to the driver 5 and receives input of information from the driver 5. The HMI unit 30 includes a visual device 31, a speaker 32, and an input device 33

The visual device 31 is placed in front of the driver 5 and provides visual information to the driver 5. Examples of the visual device 31 include a display and a luminescent device. Examples of the display include a display (a liquid crystal display, an organic electroluminescent display, and the like) installed in an instrument panel, an HUD (Head-Up Display), and the like. Examples of the luminescent device include an LED (Light Emitting Diode).

The speaker 32 outputs audio. Examples of the input device 33 include a touch panel, a button, a microphone, and the like.

The navigation information acquisition device 40 acquire navigation information NAV. The navigation information NAV includes map information, vehicle position information indicating a position of the vehicle 1, and the like. The vehicle position information is acquired by a GPS (Global Positioning System) sensor, and the like. The navigation information NAV may include a target route TR to a final destination. The navigation information NAV may include vehicle speed information indicating a vehicle speed of the vehicle 1. The vehicle speed is acquired by a vehicle speed sensor installed on the vehicle 1.

The control device (controller) 50 is a computer that executes a variety of information processing. The control device 50 includes a processor 60 and a memory device 70. The processor 60 executes a variety of information processing. For example, the processor 60 includes a CPU (Central Processing Unit). The memory device 70 stores a variety of information. For example, the driver state information DRS acquired by the driver monitor 20 is stored in the memory device 70. Examples of the memory device 70 include a volatile memory, a nonvolatile memory, and the like.

A drowsiness sign notification program FBP is a computer program executed by a computer. The variety of information processing by the processor 60 (i.e., the control device 50) is achieved by the processor 60 executing the drowsiness sign notification program FBP. The drowsiness sign notification program FBP is stored in the memory device 70. The drowsiness sign notification program FBP may be recorded on a computer-readable recording medium. The drowsiness sign notification program FBP may be provided via a network.

It should be noted that the control device 50 may be an ECU (Electronic Control Unit) installed on the vehicle 1, or may be an information processing device outside the vehicle 1. In the latter case, the control device 50 communicates with the vehicle 1 to remotely execute the variety of information processing.

2-2. Drowsiness Sign Determination Process

The control device 50 executes "drowsiness sign determination process." In the drowsiness sign determination process, the control device 50 determines whether or not the driver 5 shows a drowsiness sign based on the driver state information DRS. Hereinafter, various examples of the drowsiness sign determination process will be described. However, a concrete method of the drowsiness sign determination process is not limited in particular.

2-2-1. First Example

Figure 4:
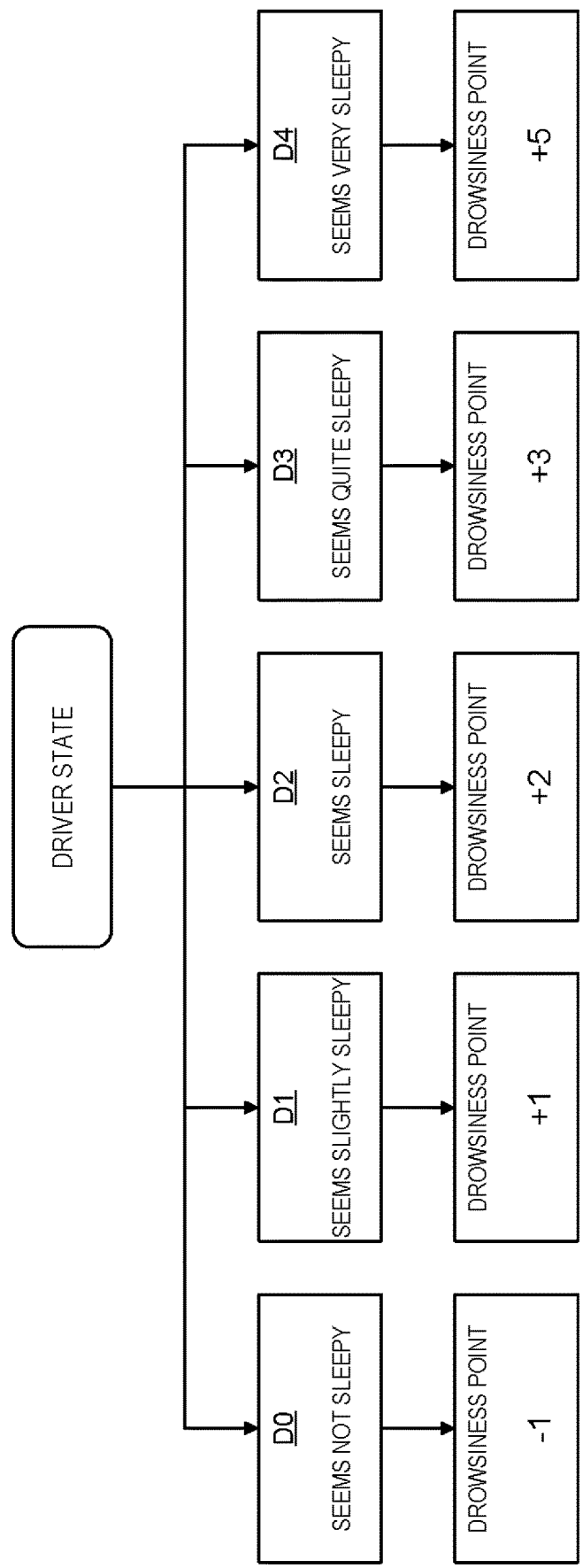
FIG. 4 is a conceptual diagram for explaining a first example of a drowsiness sign determination process according to an embodiment of the present disclosure.
Figure 5:
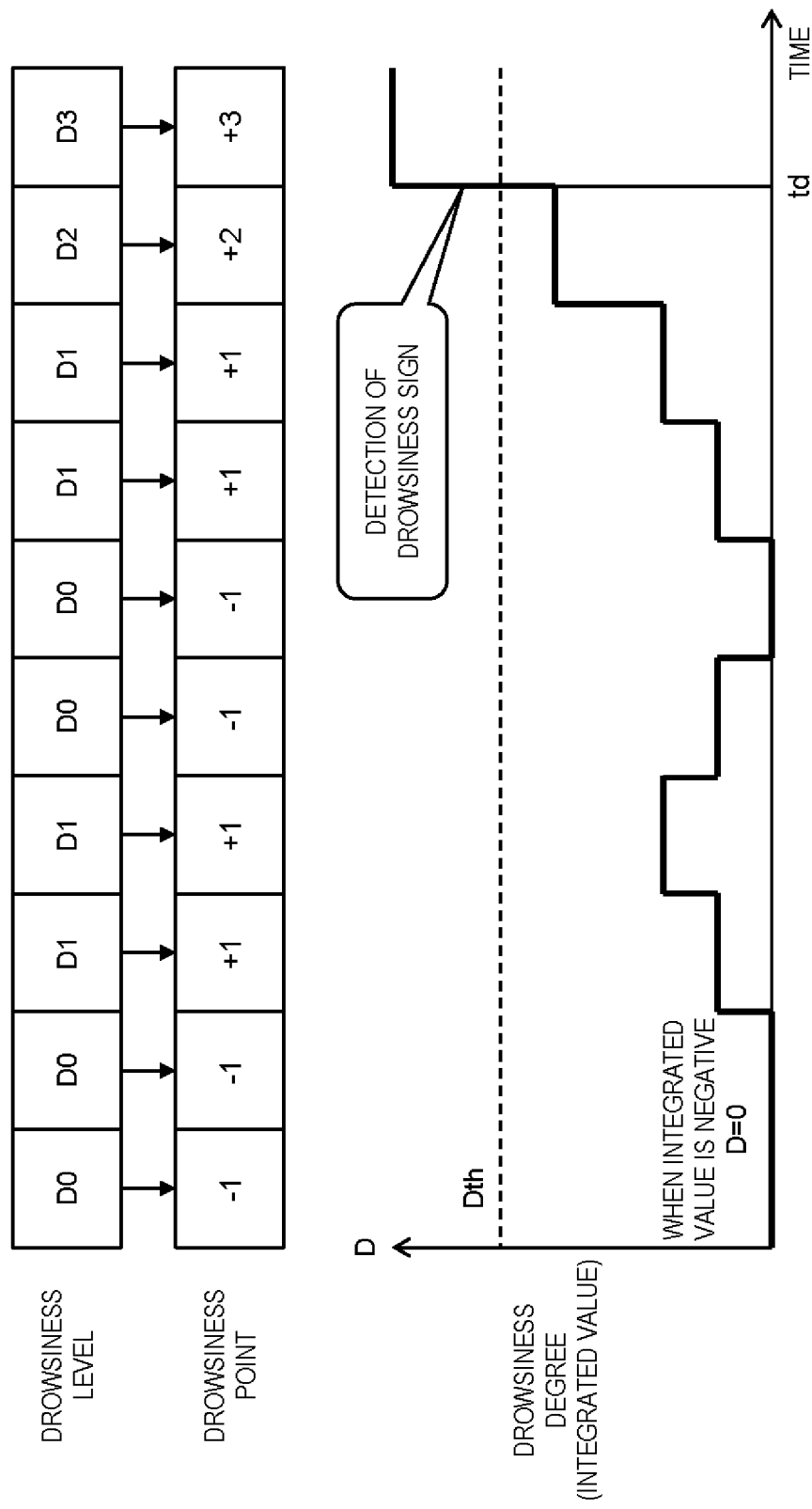
FIG. 5 is a conceptual diagram for explaining the first example of the drowsiness sign determination process according to an embodiment of the present disclosure.

FIGS. 4 and 5 are conceptual diagrams for explaining a first example of the drowsiness sign determination process. Typically, the drowsiness sign appears as a drowsiness action that is peculiar to the period before and after the driver 5 feels the drowsiness. In view of the above, in the first example, the driver state is classified (ranked) into a plurality of drowsiness levels from a viewpoint of the drowsiness action.

In the example shown in FIG. 4, the driver state is classified into five drowsiness levels D0 to D4. The drowsiness level D0 is the lowest, and the drowsiness level D4 is the highest. The higher the drowsiness level is, the stronger the drowsiness of the driver 5 is.

More specifically, the drowsiness level D0 corresponds to the driver state that seems not sleepy. Examples of the drowsiness action associated with the drowsiness level D0 include talking, checking a surrounding situation, and the like.

The drowsiness level D1 corresponds to the driver state that seems slightly sleepy. Examples of the drowsiness action associated with the drowsiness level D1 include decrease in blinking speed.

The drowsiness level D2 corresponds to the driver state that seems sleepy. Examples of the drowsiness action associated with the drowsiness level D2 include frequent blinking, head movement, and the like.

The drowsiness level D3 corresponds to the driver state that seems quite sleepy. Examples of the drowsiness action associated with the drowsiness level D3 include half-closed eyes, heavy eyelids, long yawn, and the like.

The drowsiness level D4 corresponds to the driver state that seems very sleepy. Examples of the drowsiness action associated with the drowsiness level D4 include closing eyelids and the like.

In this manner, the drowsiness action and each drowsiness level are associated with each other in advance. The control device 50 detects the drowsiness action based on the driver state information DRS (e.g., the degree of eye opening, the degree of mouth opening, and the like) acquired within a certain period of time (e.g., 10 seconds). Then, the control device 50 selects a drowsiness level associated with the detected drowsiness action.

Furthermore, as shown in FIG. 4, different drowsiness points are set for each drowsiness level. For example, the drowsiness point of the drowsiness level D0 is a negative value, and the drowsiness points of the drowsiness levels D1 to D4 are positive values. The drowsiness point increases as the drowsiness level becomes higher (as it goes from the D0 to the D4). The control device 50 converts the drowsiness level selected according to the drowsiness action into the drowsiness point. It should be noted that a correspondence relationship between the drowsiness level and the drowsiness point may vary depending on a situation.

In this manner, the control device 50 acquires the drowsiness point depending on the driver state every certain period of time (e.g., 10 seconds). Then, as shown in FIG. 5, the control device 50 integrates the drowsiness points. The integrated value of the drowsiness points is used as the "drowsiness degree D." That is, the control device 50 calculates the integrated value of the drowsiness points as the drowsiness degree D. It should be noted that when the integrated value is a negative value, the drowsiness degree D is set to 0.

Then, the control device 50 compares the drowsiness degree D with a threshold Dth. When the drowsiness degree D exceeds the threshold Dth, the control device 50 determines that the driver 5 shows the drowsiness sign. In the example shown in FIG. 5, it is determined at a time td that the driver 5 shows the drowsiness sign.

2-2-2. Second Example

Figure 6:
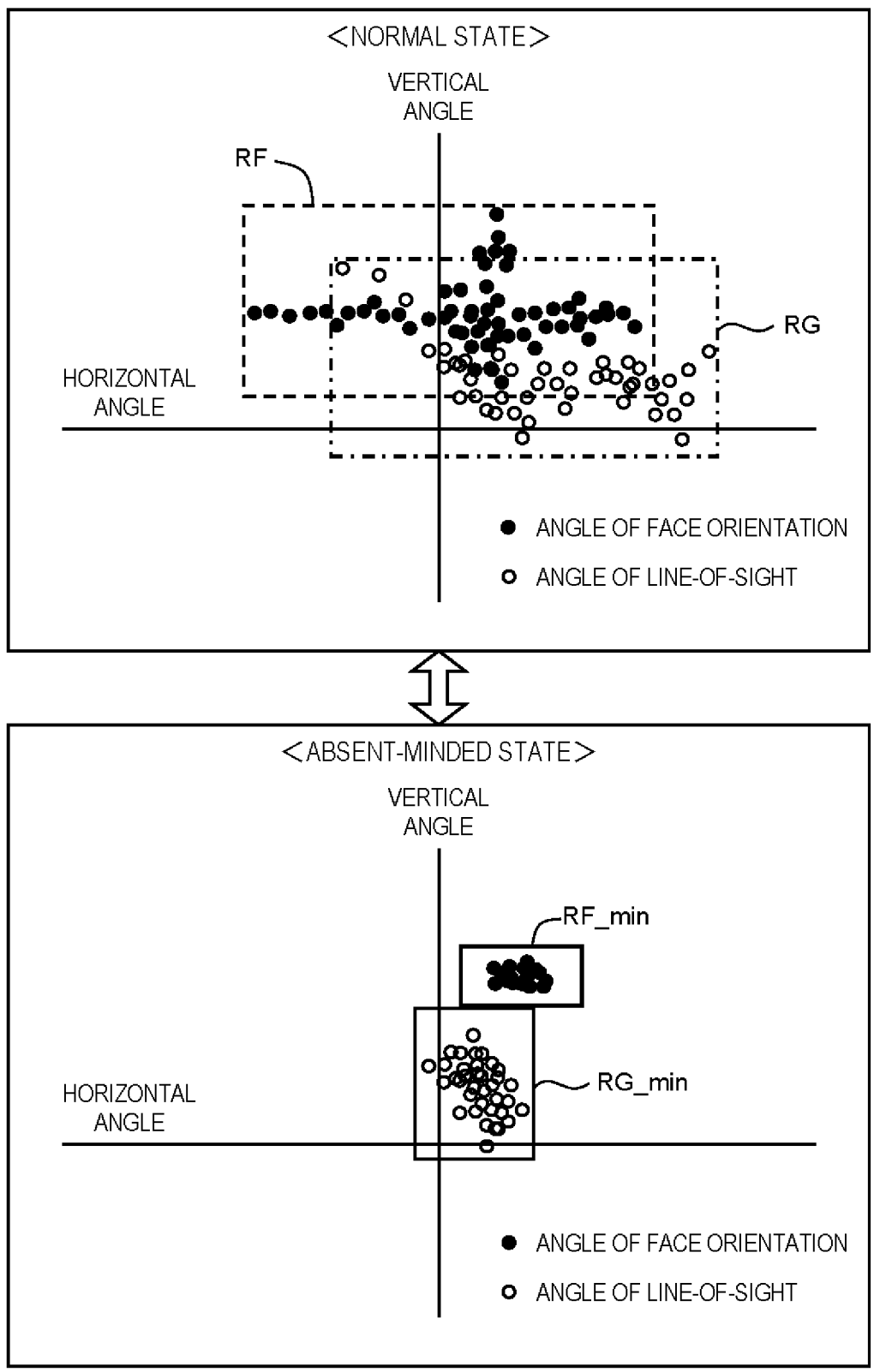
FIG. 6 is a conceptual diagram for explaining a second example of a drowsiness sign determination process according to an embodiment of the present disclosure.

FIG. 6 is a conceptual diagram for explaining a second example of the drowsiness sign determination process. In the second example, an absent-minded state of the driver 5 is detected as the drowsiness sign.

In FIG. 6, distributions of an angle of face orientation and an angle of line-of-sight of the driver 5 in a certain period of time (e.g., 30 seconds) are shown. In a case of a normal state, the angle of face orientation and the angle of line-of-sight of the driver 5 vary over a wide range. In other words, a variation range RF of the angle of face orientation and a variation range RG of the angle of line-of-sight are relatively wide. However, when the driver 5 becomes absent-minded, the variation ranges RF and RG tend to become narrower. When the variation ranges RF and RG respectively fall within predetermined ranges RF_min and RG_min, the driver 5 is considered to be in the absent-minded state.

In view of the above, the control device 50 acquires, every certain time period (e.g., 30 seconds), the variation ranges RF and RG based on the driver state information DRS (i.e., the face orientation, the line of sight, and the like) acquired within the certain time period. When the variation ranges RF and RG respectively fall within the predetermined ranges RF_min and RG_min, the control device 50 determines that the driver 5 shows the drowsiness sign.

2-2-3. Third Example

It is also possible to appropriately combine the first example and the second example. For example, when any of a first determination condition in the first example and a second determination condition in the second example is satisfied, it is determined that the driver 5 shows the drowsiness sign. As another example, the absent-minded state of the driver 5 is quantified and then added to the drowsiness degree D.

2-3. Drowsiness Sign Notification Process

Figure 7:
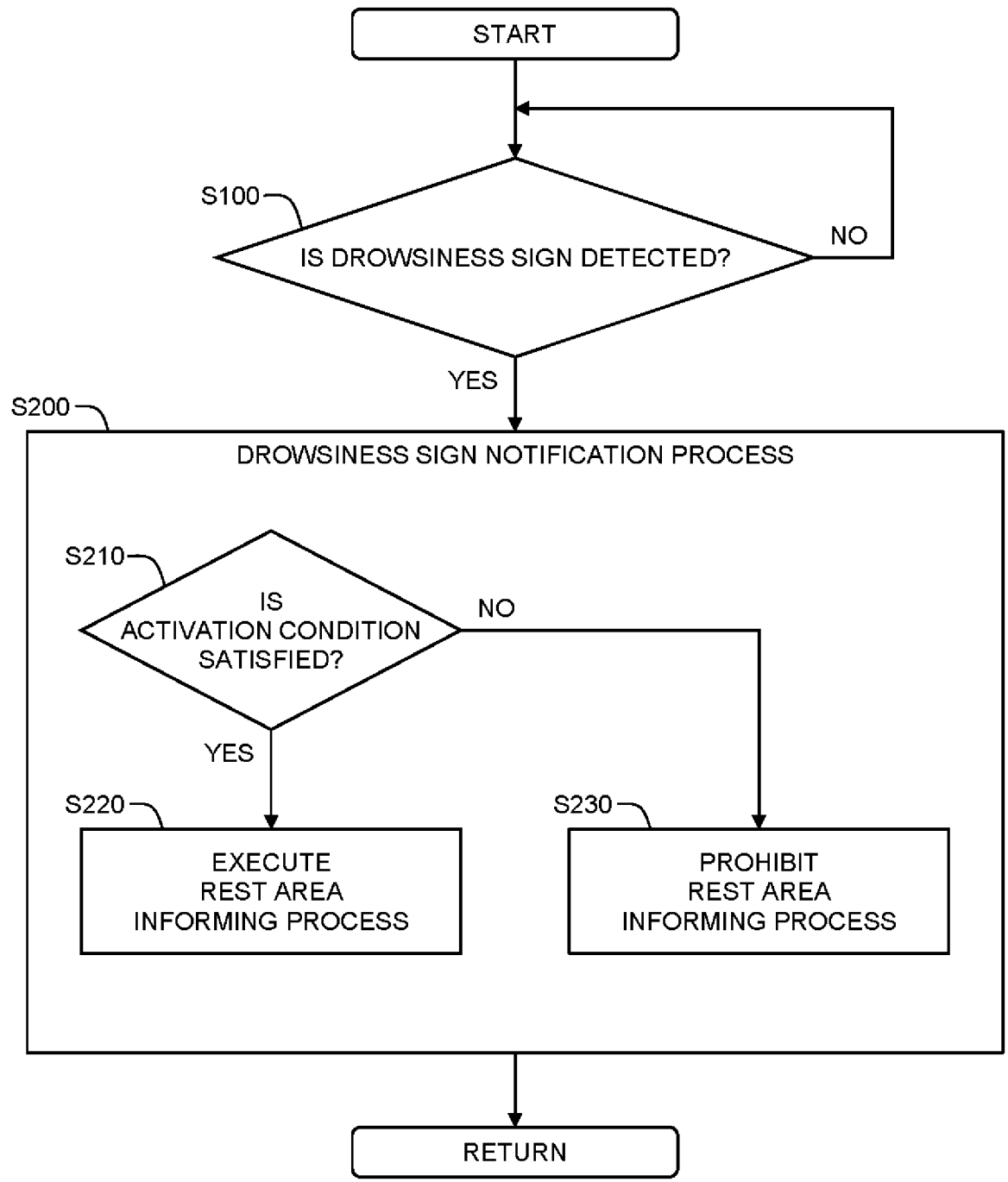
FIG. 7 is a flow chart showing processing by the drowsiness sign notification system according to an embodiment of the present disclosure.

FIG. 7 is a flow chart showing processing by the control device 50 according to the present embodiment. The control device 50 executes the above-described drowsiness sign determination process (Step S100). When it is determined that the driver 5 shows the drowsiness sign (Step S100; Yes), the control device 50 executes a "drowsiness sign notification process" (Step S200). In the drowsiness sign notification process, the control device 50 gives the drowsiness sign notice FB to the driver 5 through display, audio, vibration, or the like.

For example, the control device 50 displays a text message (e.g., "Are you sleepy?") on the visual device 31 (display). As another example, the control device 50 may make the visual device 31 (display, luminescent device) blinking. As yet another example, the control device 50 may output an audio message (e.g., "Are you sleepy?") from the speaker 32. As yet another example, the control device 50 may vibrate a seat belt worn by the driver 5. Such the drowsiness sign notice FB makes it possible to apply a stimulus to the driver 5 and to keep an awake state of the driver 5. In other words, it is possible to prevent the driver 5 from becoming an asleep state and to keep the driver 5 at a state suitable for driving.

According to the present embodiment, the drowsiness sign notice FB includes the "rest area information FB_RA" that informs (notifies) a rest area RA to the driver 5 who is determined to show the drowsiness sign. The rest area information FB_RA may positively suggest in a dialogic manner to the driver 5 to stop by the rest area RA.

For example, the control device 50 outputs a suggestion message (e.g., "There is a Shizuoka service area nearby. Do you want to stop by?") to the driver 5 from the speaker 32. At the same time, the control device 50 may display the suggestion message on the visual device 31 (display). The driver 5 returns an answer (Yes/No) to the suggestion message. The control device 50 acquires voice of the driver 5 through the input device 33 (microphone) and recognizes the answer of the driver 5 by performing speech recognition processing. In a case where the driver 5 accepts the suggestion, the control device 50 sets the rest area RA as a stop-off point. Due to such a dialogue process, it is expected that the driver 5 does at least not get sleepier. In other words, due to the dialogue process, it is expected that at least the current awake state is maintained. Such the dialogue performed in the drowsiness sign notification process can also be called "awakening dialogue", "navigation dialogue", or "agent dialogue."

The drowsiness sign notification process (Step S200) includes a "rest area informing process" that gives the rest area information FB_RA to the driver 5. However, the rest area informing process is not performed unconditionally. According to the present embodiment, an "activation condition" for activating the rest area informing process is set. The control device 50 determines whether or not the activation condition of the rest area informing process is satisfied (Step S210). When the activation condition is satisfied (Step S210; Yes), the control device 50 executes the rest area informing process (Step S220). On the other hand, when the activation condition is not satisfied (Step S210; No), the control device 50 prohibits the rest area informing process (Step S230).

Hereinafter, the activation condition of the rest area informing process according to the present embodiment will be described.

3. Activation Condition of Rest Area Informing Process 3-1. First Example

In a first example, a case where a target route TR required for the vehicle 1 to reach a final destination is already set is considered. In this case, it is not preferable to give information of a rest area RA whose location is hard for the vehicle 1 to return back to the target route TR.

Figure 8:
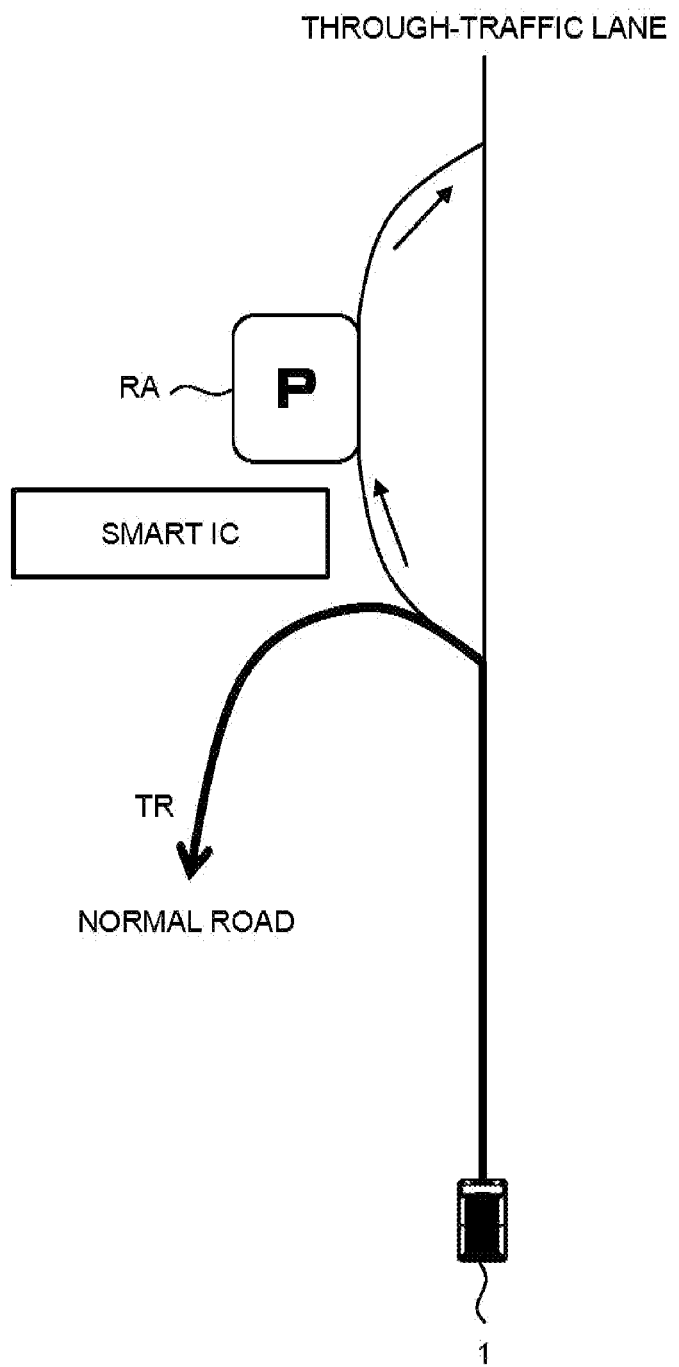
FIG. 8 is a conceptual diagram for explaining an example of a problem solved by an embodiment of the present disclosure.

For instance, FIG. 8 illustrates a situation where the vehicle 1 travels on an express way. The target route TR is such a route that gets off the express way at an interchange located ahead of the vehicle 1 and heads to a normal road. That is, the target route TR branches at the interchange from a through-traffic lane. In a case where the interchange is a so-called "smart interchange", there is a rest area RA such as a service area and a parking area. In the case of the smart interchange, as shown in FIG. 8, a road heading to the normal road may be different from a road heading to the rest area RA. In that case, once the vehicle 1 enters the rest area RA, it may be hard to head to the normal road, although the vehicle 1 is able to return to the through-traffic lane. That is to say, if the vehicle 1 enters the rest area RA of the smart interchange, it may be hard for the vehicle 1 to return back to the target route TR. Therefore, it is not necessarily appropriate to give information of the rest area RA of the smart interchange at which the vehicle 1 is scheduled to get off.

A similar situation can occur also in a normal road. For example, let us consider a case where the target route TR is such a route that does not go across a grade separation located ahead of the vehicle 1 and gets off a through-traffic lane before the grade separation. In this case, if the vehicle 1 enters a rest area RA located beyond the grade separation, it may be hard for the vehicle 1 to return back to the target route TR. Therefore, it is not necessarily appropriate to give information of the rest area RA that is located beyond the grade separation at which the target route TR branches.

In view of the above, the first example of the activation condition of the rest area informing process is set from a viewpoint of a relationship between a location of the rest area RA and the target route TR.

Figure 9:
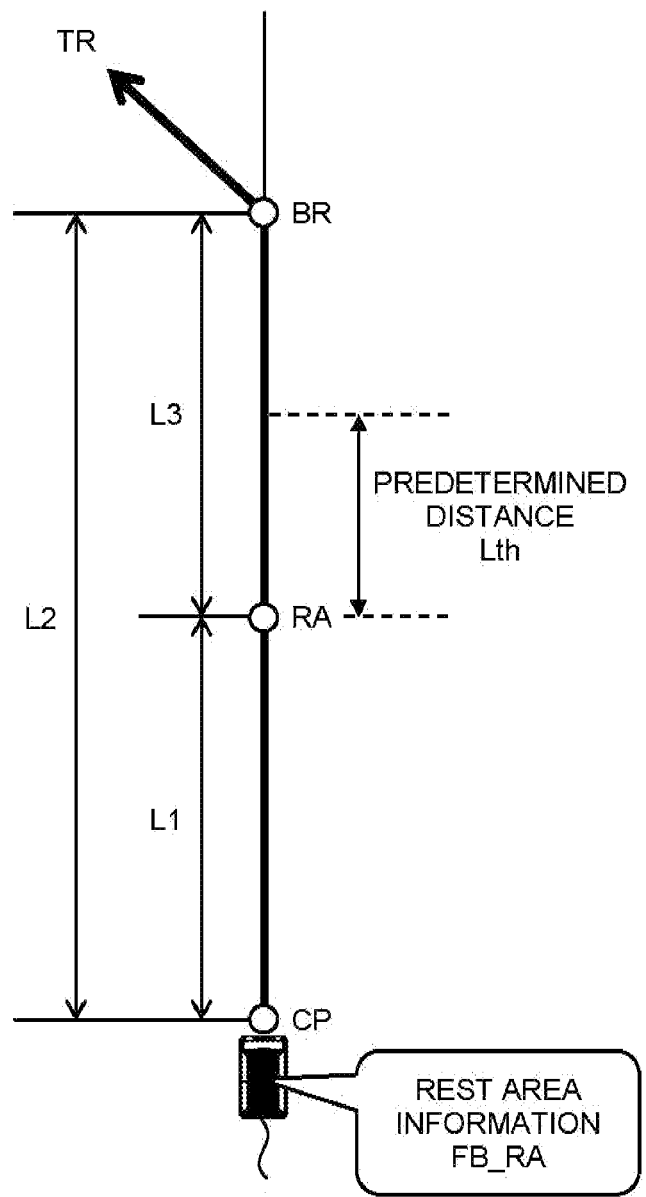
FIG. 9 is a conceptual diagram for explaining a first example of an activation condition of a rest area informing process by the drowsiness sign notification system according to an embodiment of the present disclosure.

FIG. 9 is a conceptual diagram for explaining the first example of the activation condition of the rest area informing process. A "branch point BR" is a position at which the target route TR of the vehicle 1 branches from a road on which the vehicle 1 is currently traveling. An example of the branch point BR is an interchange at which the vehicle 1 traveling along the target route TR is scheduled to get off. Another example of the branch point BR is a grade separation at which the target route TR braches.

A first distance L1 is a distance from a current position CP of the vehicle 1 to the rest area RA. A second distance L2 is a distance from the current position CP of the vehicle 1 to the branch point BR. A third distance L3 is a distance between the rest area RA and the branch point BR. The first example of the activation condition of the rest area informing process is that "the second distance L2 is larger than the first distance L1 (L2>L1) and the third distance L3 is equal to or larger than a predetermined distance Lth (L3>Lth)." For example, in the case of the express way, the predetermined distance Lth is 5000 m.

Since the second distance L2 is larger than the first distance L1, information of a rest area RA located before the branch point BR is given. In other words, it is prevented that information of a rest area RA located beyond the branch point BR is given. As a result, the vehicle 1 is prevented from greatly deviating from the target route TR. There is no need to return from the rest area RA in order to return back to the target route TR.

Moreover, since the third distance L3 is equal to or larger than the predetermined distance Lth, information of a rest area RA whose location is separated from the branch point BR to some extent is given. In other words, it is prevented that information of a rest area RA too close to the branch point BR is given. For example, it is prevented that information of the rest area RA existing in the smart interchange as shown in FIG. 8 is given. As a result, it is suppressed that the vehicle 1 becomes hard to return back to the target route TR.

The navigation information NAV includes the map information, the vehicle position information, and the target route TR. The branch point BR and the rest area RA are registered in the map information and those locations are obtained from the map information. It should be noted that when the branch point BR is an interchange, a location of a tollgate registered in the map information may be regarded as the location of the branch point BR. The current position CP of the vehicle 1 is obtained from the vehicle position information.

Based on the navigation information NAV, the control device 50 searches for a rest area RA located ahead of the current position CP as a candidate. Then, with regard to the candidate, the control device 50 calculates the first distance L1, the second distance L2, and the third distance L3 based on the navigation information NAV and determines whether or not the activation condition is satisfied (Step S210). When the activation condition is satisfied (Step S210; Yes), the control device 50 sets the candidate as the rest area RA being an object and executes the rest area informing process (Step S220). On the other hand, when the activation condition is not satisfied (Step S210; No), the control device 50 discards the candidate (Step S230). When discarding the candidate, the control device 50 may search for another candidate.

According to the first example, as described above, the activation condition of the rest area informing process is set from a viewpoint of a relationship between the location of the rest area RA and the target route TR. More specifically, the activation condition of the rest area informing process is set from a viewpoint of a relationship between the first distance L1, the second distance L2, and the third distance L3. As a result, it is prevented that information of the rest area RA whose location is hard for the vehicle 1 to return back to the target route TR is given.

3-2. Second Example

Figure 10:
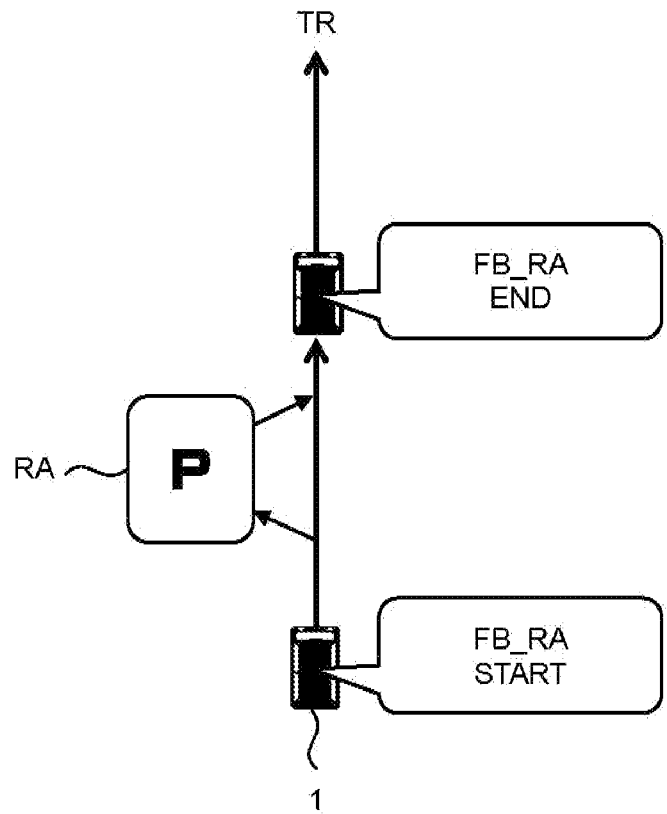
FIG. 10 is a conceptual diagram for explaining another example of a problem solved by an embodiment of the present disclosure.

FIG. 10 illustrates a case where the rest area information FB_RA for informing a rest area RA is started immediately before the rest area RA. In this case, the vehicle 1 possibly passes the informing rest area RA in the middle of giving the rest area information FB_RA. In other words, there is a possibility that the vehicle 1 is not able to enter the rest area RA informed.

In view of the above, a second example of the activation condition of the rest area informing process is set from a viewpoint of an expected time required for the vehicle 1 to reach the rest area RA.

Figure 11:
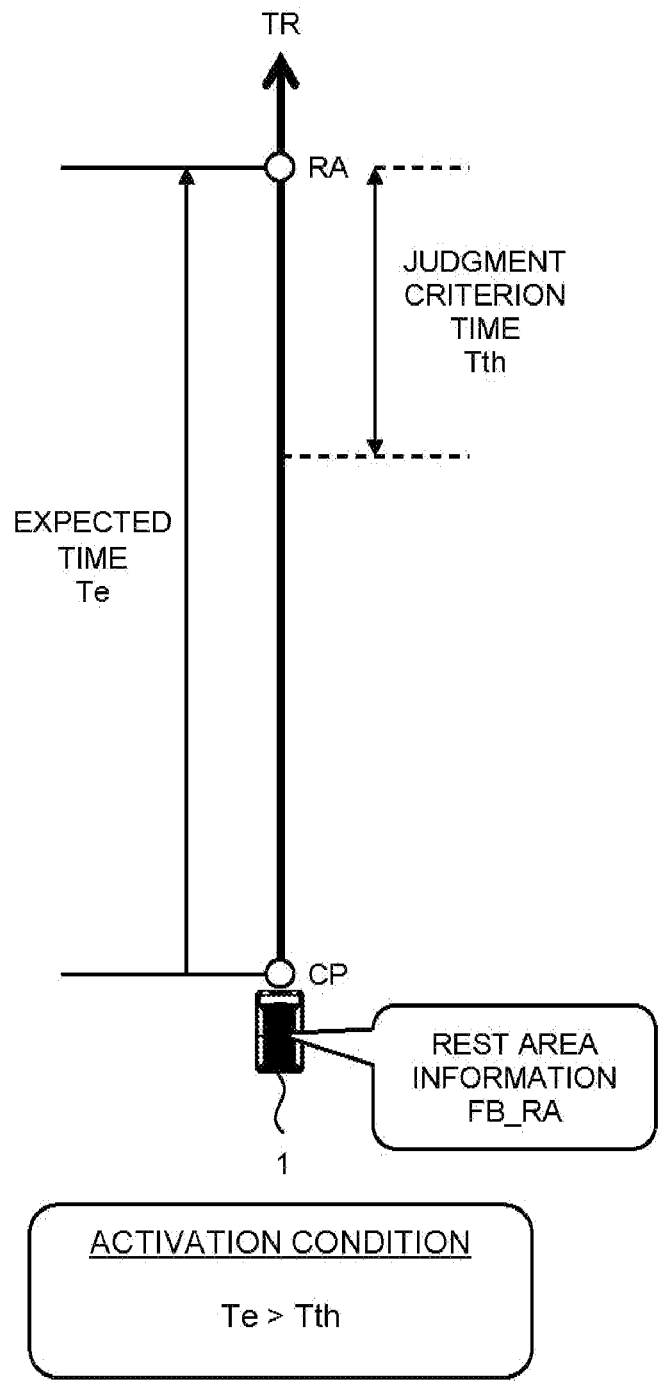
FIG. 11 is a conceptual diagram for explaining a second example of the activation condition of the rest area informing process by the drowsiness sign notification system according to an embodiment of the present disclosure.

FIG. 11 is a conceptual diagram for explaining the second example of the activation condition of the rest area informing process. An expected time Te is an expected time required for the vehicle 1 to reach the rest area RA from the current position CP. The second example of the activation condition of the rest area informing process is that "the expected time Te is longer than a judgment criterion time Tth (Te>Tth)."

The judgment criterion time Tth at least includes an "informing time" required for the rest area informing process. For example, the informing time includes a time required for outputting the suggestion message from the speaker 32, a maximum waiting time for receiving a response from the driver 5, a time required for speech recognition processing, and the like. Typically, the informing time is a predetermined constant time. Since the rest area informing process is activated when the expected time Te is longer than the informing time, it is prevented that the vehicle 1 passes the rest area RA whose information is being given.

In a case where the vehicle 1 performs automated driving control, the judgment criterion time Tth may be a sum the "informing time" described above and an "automated driving control time." Here, the automated driving control time is a maximum time required for the automated driving control that the vehicle 1 performs before the rest area RA in order to enter the rest area RA. For example, when the vehicle 1 is traveling in an overtaking lane, it is necessary to make a lane change in order to enter the rest area RA A maximum time (worst case time) required for the lane change is the automated driving control time. Typically, the automated driving control time is a predetermined constant time. Since the automated driving control time also is taken into consideration, it is possible to surely enter the rest area RA even in the case where the vehicle 1 performs the automated driving control.

The navigation information NAV includes the map information, the vehicle position information, and the vehicle speed information. The rest area RA is registered in the map information and its location is obtained from the map information. The current position CP of the vehicle 1 is obtained from the vehicle position information. The expected time Te is calculated from the map information, the current position CP, the location of the rest area RA, and the vehicle speed.

Based on the navigation information NAV, the control device 50 searches for a rest area RA located ahead of the current position CP as a candidate. Then, with regard to the candidate, the control device 50 calculates the expected time Te based on the navigation information NAV and determines whether or not the activation condition is satisfied (Step S210). When the activation condition is satisfied (Step S210; Yes), the control device 50 sets the candidate as the rest area RA being an object and executes the rest area informing process (Step S220). On the other hand, when the activation condition is not satisfied (Step S210; No), the control device 50 discards the candidate (Step S230). When discarding the candidate, the control device 50 may search for another candidate.

According to the second example, as described above, the activation condition of the rest area informing process is set from a viewpoint of the expected time Te required for the vehicle 1 to reach the rest area RA. As a result, it is prevented that the vehicle 1 passes the rest area RA in the middle of giving information.

3-3. Third Example

It is also possible to combine the first example and the second example described above. That is to say, the activation condition of the rest area informing process may include both the first example and the second example.

4. Automated Driving System

The vehicle 1 according to the present embodiment may perform automated driving. Even during the automated driving, there is a case where it is important to keep the awake state of the driver 5. For example, when the driver 5 performs hands-off driving during the automated driving of Level-2, a degree of concentration on the driving may decrease. The degree of concentration of the driver is especially required in such scenes as traveling on an expressway, lane change, merging, being merged, overtaking, and the like. Moreover, in a case of the automated driving of Level-3, the driver 5 must return to manual driving in response to a demand from an automated driving system. Therefore, the drowsiness sign notification system 10 according to the present embodiment is useful even during the automated driving.

Figure 12:
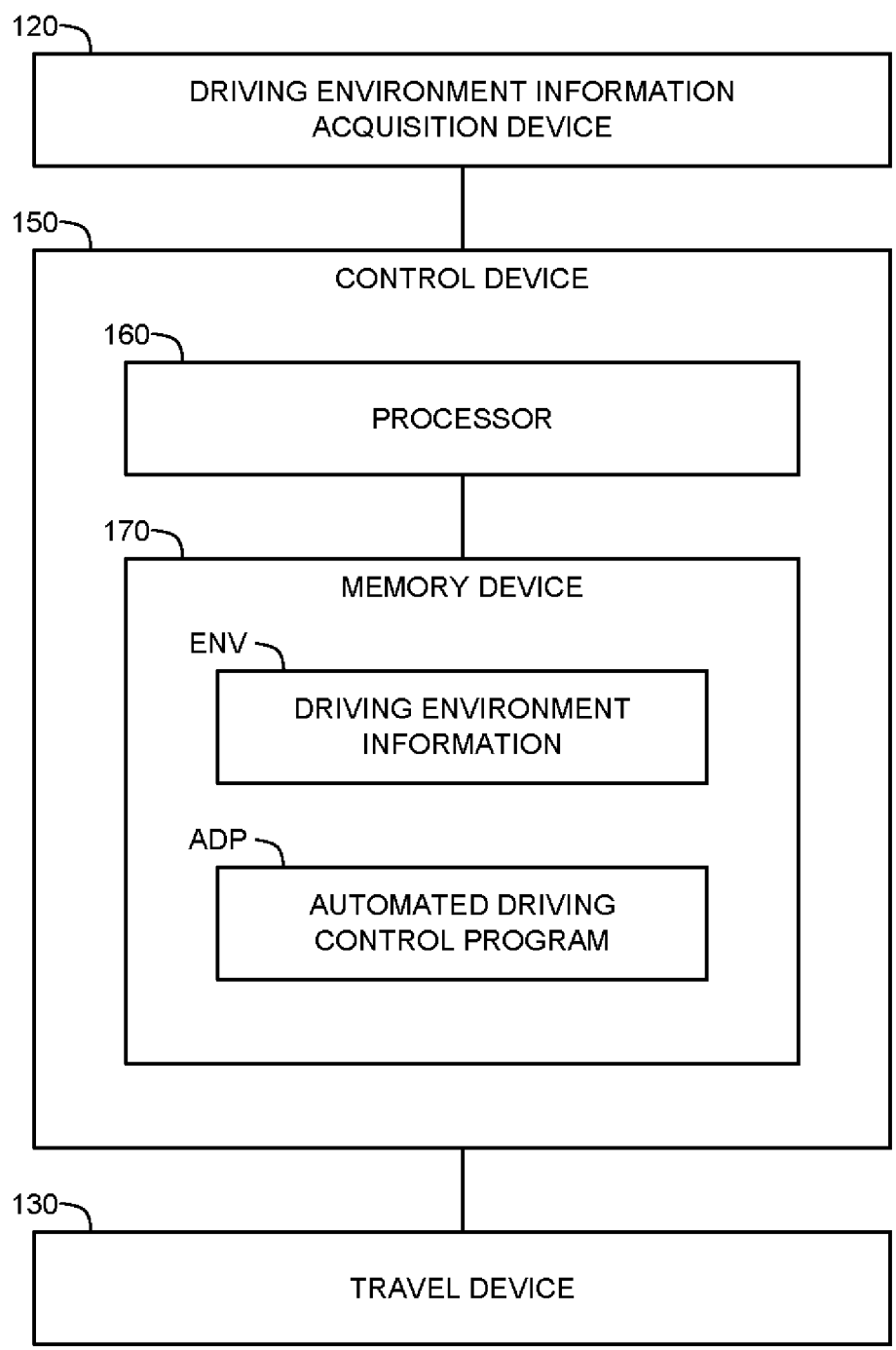
FIG. 12 is a block diagram showing a configuration example of an automated driving system according to an embodiment of the present disclosure.

FIG. 12 is a block diagram showing a configuration example of an automated driving system 100 according to the present embodiment. The automated driving system 100 includes a driving environment information acquisition device 120, a travel device 130, and a control device (controller) 150.

The driving environment information acquisition device 120 acquires driving environment information ENV indicating a driving environment for the vehicle 1. For example, the driving environment information ENV includes map information, vehicle position information, vehicle state information, surrounding situation information, and the like.

The map information includes a general navigation map. The map information may further indicate a lane configuration, a road shape, and the like. The driving environment information acquisition device 120 acquires necessary map information from a map database.

The vehicle position information indicates a position and an orientation of the vehicle 1 on a map. The driving environment information acquisition device 120 acquires the vehicle position information by the use of a GPS (Global Positioning System) sensor. The driving environment information acquisition device 120 may acquire more accurate vehicle position information by performing a well-known localization.

The vehicle state information indicates a vehicle state such as a speed (vehicle speed), a steering angle, a lateral acceleration, and the like of the vehicle 1. The driving environment information acquisition device 120 acquires the vehicle state information by the use of sensors installed on the vehicle 1.

The surrounding situation information indicates a situation around the vehicle 1. The driving environment information acquisition device 120 acquires the surrounding situation information by the use of a recognition sensor installed on the vehicle 1. Examples of the recognition sensor includes a camera, a radar, a LIDAR (Laser Imaging Detection and Ranging), and the like.

The travel device 130 includes a steering device, a driving device, and a braking device. The steering device turns wheels of the vehicle 1. For example, the steering device includes an electric power steering (EPS) device. The driving device is a power source that generates a driving force. Examples of the drive device include an engine, an electric motor, an in-wheel motor, and the like. The braking device generates a braking force.

The control device (controller) 150 is a computer that executes a variety of information processing. The control device 150 includes a processor 160 and a memory device 170. The processor 160 executes a variety of information processing. For example, the processor 160 includes a CPU. The memory device 170 stores a variety of information. For example, the driving environment information ENV descried above is stored in the memory device 170. Examples of the memory device 170 include a volatile memory, a nonvolatile memory, and the like.

The control device 150 executes "automated driving control" that controls the automated driving of the vehicle 1. For example, the control device 150 determines a target route to a destination based on the map information and the vehicle position information. The determined target route is managed together with the map information.

Moreover, the control device 150 generates a travel plan of the vehicle 1 during the automated driving based on the driving environment information ENV. Examples of the travel plan include keeping a current travel lane, making a lane change, and the like. Furthermore, the control device 150 generates a target trajectory required for the vehicle 1 to travel in accordance with the travel plan. Then, the control device 150 executes vehicle travel control by controlling the travel device 130 such that the vehicle 1 follows the target trajectory.

An automated driving control program ADP is a computer program executed by a computer. The automated driving control by the processor 160 (i.e., the control device 150) is achieved by the processor 160 executing the automated driving control program ADP. The automated driving control program ADP is stored in the memory device 170. The automated driving control program ADP may be recorded on a computer-readable recording medium. The automated driving control program ADP may be provided via a network.

It should be noted that the control device 150 may be an ECU installed on the vehicle 1, or may be an information processing device outside the vehicle 1. In the latter case, the control device 150 communicates with the vehicle 1 to remotely execute the automated driving control.

The drowsiness sign notification system 10 according to the present embodiment may be included in the automated driving system 100. The control device 50 of the drowsiness sign notification system 10 may be included in the control device 150, or may be separated from the control device 150. The drowsiness sign notification program FBP of the drowsiness sign notification system 10 may be included in the automated driving control program ADP, or may be separated from the automated driving control program ADP. The navigation information acquisition device 40 of the drowsiness sign notification system 10 may be included in the driving environment information acquisition device 120 of the automated driving system 100. The navigation information NAV may be included in the driving environment information ENV.

What is claimed is:

1. A drowsiness sign notification system applied to a vehicle,
    the drowsiness sign notification system comprising:
    a driver monitor configured to detect a driver state being a state of a driver of the vehicle; and
    a controller configured to execute:
        a drowsiness sign determination process that determines whether or not the driver shows a drowsiness sign based on the driver state; and
        rest area informing process that informs the driver of a rest area, when it is determined that the driver shows the drowsiness sign and an activation condition is satisfied, wherein
    a branch point is a position at which a target route of the vehicle branches from a road on which the vehicle is currently traveling,
    a first distance is a distance from a current position of the vehicle to the rest area,
    a second distance is a distance from the current position to the branch point,
    a third distance is a distance between the rest area and the branch point, and
    the activation condition of the rest area informing process includes that the second distance is larger than the first distance and the third distance is equal to or larger than a predetermined distance.

2. The drowsiness sign notification system according to claim 1, wherein
    the branch point is an interchange at which the vehicle traveling along the target route is scheduled to get off.

3. The drowsiness sign notification system according to claim 1, wherein
    the activation condition of the rest area informing process further includes that an expected time required for the vehicle to reach the rest area from the current position is longer than a judgment criterion time, and
    the judgment criterion time at least includes an informing time required for the rest area informing process.

4. The drowsiness sign notification system according to claim 3, wherein
    the vehicle performs automated driving control,
    an automated driving control time is a maximum time required for the automated driving control that the vehicle performs before the rest area in order to enter the rest area, and
    the judgment criterion time is a sum of the informing time and the automated driving control time.

5. A drowsiness sign notification method applied to a vehicle having a driver monitor that detects a driver state being a state of a driver of the vehicle,
    the drowsiness sign notification method comprising:
    a drowsiness sign determination process that determines whether or not the driver shows a drowsiness sign based on the driver state; and
    rest area informing process that informs the driver of a rest area, when it is determined that the driver shows the drowsiness sign and an activation condition is satisfied, wherein
    a branch point is a position at which a target route of the vehicle branches from a road on which the vehicle is currently traveling,
    a first distance is a distance from a current position of the vehicle to the rest area,
    a second distance is a distance from the current position to the branch point,
    a third distance is a distance between the rest area and the branch point, and
    the activation condition of the rest area informing process includes that the second distance is larger than the first distance and the third distance is equal to or larger than a predetermined distance.

* * * * *